(12) United States Patent
Kimber et al.

(10) Patent No.: US 7,775,439 B2
(45) Date of Patent: Aug. 17, 2010

(54) FEATURED WANDS FOR CAMERA CALIBRATION AND AS A GESTURE BASED 3D INTERFACE DEVICE

(75) Inventors: Donald G. Kimber, Foster City, CA (US); Feng Guo, Tempe, AZ (US); Eleanor G. Rieffel, Mountain View, CA (US); Kazumasa Murai, Hadano (JP); Stephen Omohundro, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 785 days.

(21) Appl. No.: 11/680,515

(22) Filed: Feb. 28, 2007

(65) Prior Publication Data
US 2008/0167818 A1 Jul. 10, 2008

Related U.S. Application Data

(60) Provisional application No. 60/883,504, filed on Jan. 4, 2007.

(51) Int. Cl.
*G06K 7/10* (2006.01)
(52) U.S. Cl. .................................. 235/472.01; 345/156
(58) Field of Classification Search ............ 235/472.01; 345/157, 158, 179; 700/83, 85
See application file for complete search history.

(56) References Cited

U.S. PATENT DOCUMENTS 6,740,863 B2 * 5/2004 Sawyer et al. ............... 250/221

2005/0275623 A1 * 12/2005 Chadha ....................... 345/156

OTHER PUBLICATIONS

Yasuji Seko, et al., "Proposal of recordable pointer: Pointed position measurement by projecting interference concentric circle pattern with a pointing device." IEEE, 2006, Corporate Research Group, Fuji Xerox Co., Ltd.

Derek Bradley, et al. *Six Degree-of Freedom Sphere Tracking for 3D Interaction*, Graphics Interface, 2005.

Xiang Cao, et al. *VisionWand: Interaction Techniques for Large Displays using a Passive Wand Tracked in 3D*, Symposium on User Interface Software and Technology, Proceedings of the 16th annual ACM symposium on User interface software and technology, 2003, pp. 173-182, vol. 5, Issue 2.

(Continued)

*Primary Examiner*—Daniel A Hess
(74) *Attorney, Agent, or Firm*—Sughrue Mion, PLLC

(57) ABSTRACT

Passive wands, tracked by one or more cameras, are used as user interface devices. The wands are inexpensive, and are a natural way for users to interact with devices such as large displays. Each wand may be used to specify a full 6 degrees of freedom, which can be helpful for manipulation of 3D applications. The wands may also be used to identify 3D world points, which is useful for multi-camera calibration, and for building 3D models of physical spaces. The described methods provide a more precise estimation of wand pose, and can be implemented with a single camera. Also described is a method for estimation wand pose using information available along a one dimensional 'line scan' within the image, which simplifies processing.

32 Claims, 5 Drawing Sheets

OTHER PUBLICATIONS

Xing Chen, et al. *Wide Area Camera Calibration Using Virtual Calibration Objects*, IEEE Comp. Soc. Conf. on Computer Vision and Pattern Recognition (CVPR), Jun. 2000.

Jan Ciger, et al. *The Magic Wand*, Proceeding of the 19$^{th}$ spring conference on Computer graphics, 2003. pp. 119-124.

Scott Elrod, et al. *Liveboard: A Large Interactive Display Supporting Group Meetings, Presentations, and Remote Collaboration*, ACM CHI Conference on Human Factors in Computing Systems, 1992.

Ji-Young Oh, et al. *Laser Pointers as Collaborative Pointing Devices*, Graphics Interface, 2002, pp. 141-149.

Yoichi Sato, et al. *Real-Time Input of 3D Pose and Gestures of a User's Hand and Its Applications for HCI*, IEEE Virtual Reality Conference (IEEE VR), Mar. 2001, pp. 79-86.

Andrew Wilson, et al. *XWand: UI for Intelligent Spaces*, Conference on Human Factors in Computing Systems, Proceedings of the SIGCHI conference on Human Factors in computing systems table of contents, Apr. 2003, pp. 545-552, Volume No. 5, Issue No. 1.

\* cited by examiner

FEATURED WANDS FOR CAMERA CALIBRATION AND AS A GESTURE BASED 3D INTERFACE DEVICE

CROSS REFERENCE TO RELATED APPLICATIONS

This application is an application filed under 35 U.S.C. §111(a), claiming benefit pursuant to 35 U.S.C. §119(e)(1) of the filing date of the Provisional Application, No. 60/883,504, filed Jan. 4, 2007, pursuant to 35 U.S.C. §111(b).

DESCRIPTION OF THE INVENTION

1. Field of the Invention

The present invention generally relates to computer interfaces and, more specifically, to gesture interfaces. In addition, the present invention also relates to techniques for camera calibration.

2. Description of the Related Art

Two conventional types of gesture interfaces are in common use. One requires sensors placed in hardware like gloves that users are required to wear. This solution is both expensive and unpopular with users. The other is restricted to user's two-dimensional interaction with a screen either through touching or through location determination from sensors. The former provides the user with more degrees of freedom and, therefore, can support a larger vocabulary of basic interactions than can be supported with the latter. For example, the use of wands as user interfaces supports a full six degrees of freedom as opposed to two degrees, and the use of multiple wands support even more degrees of freedom. Even in those cases, where two degrees of freedom support a wide enough vocabulary for the interaction, the aforesaid alternative interfaces have advantages; for example because interactions with large screens require the user to get close enough in order to touch them resulting in loss of the overall perspective.

For some applications, a partial solution is to place sensors in an object that can be picked up and put down and which is similar to an object that people are familiar with using in that setting. For example, sensors can be added to a variety of pointing devices. However, this solution suffers from various problems including expense, weight, easily broken components, and the need for power supplied either through a tether or by a battery. Computer vision based systems avoid the last three of these problems. In such systems, essentially all of the system's expense goes into the cameras, which are daily becoming less and less expensive. Furthermore, computer vision based systems can be modified to work with an endless variety of objects. The main limiting factor is which objects can be robustly tracked. For example, computer vision systems designed to track hand gestures are appealing, but suffer from significant robustness problems due to difficulties in tracking hands.

Thus, of particular interest are simple, static, inexpensive objects that support robust gesture interfaces through computer vision techniques having all of the intelligence in the associated camera system. Work of Cao and Balakrishnan, described in Xiang Cao, Ravin Balakrishnan, VisionWand: Interaction techniques for large displays using a passive wand tracked in 3D, Symposium on User Interface Software and Technology, Proceedings of the 16th annual ACM symposium on User interface software and technology, pp. 173-182 (2003), shows that such systems are not only possible, but effective and intuitive in their interaction, a property much appreciated by users. The authors use a simple wand with colored ends, which can be easily tracked by cameras against a background of contrasting colors. A variety of simple wand gestures are used to control a photo application on a large screen, supporting both interactions directly with the photographs and making choices from menus. Described below are two examples to illustrate the advantages of even simple gesture interfaces. A "push" gesture with the wand parallel to the screen zooms in, while a "pull" gesture zooms out. Holding the wand steady parallel to the screen for a short time brings up a pie menu and a rotate gesture is used to move between the menu items. As users become familiar with the system they learn to place the wand already in the rotated position of the menu item they desire. Such abbreviated interactions are only possible because the aforesaid gesture interface has these degrees of freedom available.

However, the conventional technology fails to provide a technique for improved wand detection and tracking, which would support interaction of the user with the computer system interface even when much of the view of the object is occluded, including both ends, and enable determination of the twist of the object, thereby supporting another natural degree of freedom for a gesture interface to use. In addition, it would be desirable to have wands that would enable a much higher degree of precision, such that they may be used as precise pointing devices, suitable for example, for controlling positions in a 3D modeling tool.

SUMMARY OF THE INVENTION

The inventive methodology is directed to methods and systems that substantially obviate one or more of the above and other problems associated with conventional gesture interfaces.

In accordance with one aspect of the inventive concept, there is provided a computer interface system including at least one camera operable to create an image of a wand handled by a user, the wand having multiple features; and a processing module operable to receive the created image of the wand and determine the pose of the wand based on the features of the wand. The pose of the wand includes a position of the wand, an orientation of the wand and a twist of the wand. The pose of the wand determined in the described manner is used to control a user application.

In accordance with another aspect of the inventive concept, there is provided a wand for use in a gesture computer interface. The inventive wand includes a twist code region; a color code region; and a precision feature region.

In accordance with another aspect of the inventive concept, there is provided a method for controlling a computer application based on a pose of a wand handled by a user, the wand having multiple features. The inventive method involves creating an image of a wand handled by the user using at least one camera and using the created image to determine the pose of the wand based on the features of the wand. The pose of the wand includes a position of the wand, an orientation of the wand and a twist of the wand. The inventive method further involves controlling the computer application based on the determined pose of the wand.

In accordance with another aspect of the inventive concept, there is provided a method involving controlling a computer application based on an image of a wand handled by the user created by at least one camera; and calibrating the at least one camera based on the image of the wand obtained by the at least one camera.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
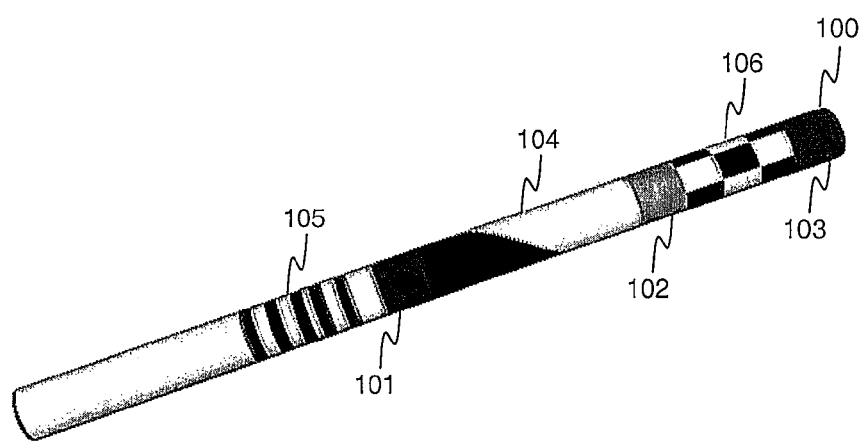
FIG. 1 illustrates an exemplary embodiment of a wand.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The inventive techniques described herein improve on the aforesaid Cao and Balakrishnan's work referred to hereinabove in a number of substantive ways. In particular, the inventive techniques make the wand significantly easier to detect and track, support interaction even when much of the view of the object is occluded including both ends, and enable determination of the twist of the object, thereby supporting another natural degree of freedom for a gesture interface to use. In the aforesaid work of Cao and Balakrishnan's, the primary role of the wand was as a gesture device, not as a precise pointing device since in their case precision was hard to achieve. The inventive wands enable a much higher degree of precision, therefore they may be used as precise pointing devices, suitable for example, for controlling positions in a 3D modeling tool. To enable the inventive wands to be utilized as precise pointing devices, the wands incorporate one or more features. A feature is defined as something that can be seen in an image. In other words, the feature is a visual region, which may include points, lines, curves, as well as 2D regions, located on the wand. It should be noted that the aforesaid visual region may be visible (detectable) in infrared (IR) light or in electromagnetic waves having other wavelength characteristics.

The minimum number of required features on the wand is determined by the number of provided cameras. For example, determining pose of the wand with a single camera requires at least three features, while determining the pose with multiple cameras requires two features.

Application to Camera Calibration and 3D Reconstruction

A desirable first step in any computer vision system is calibrating the cameras. A common way to calibrate cameras is to wave a checkerboard around in front of them. For calibrating more than one camera at a time, if the cameras are not similarly positioned, it can often be difficult to find positions for the checkerboard, which multiple cameras can identify at the same time. Also, the checkerboard is used only for calibration, not as part of the system; it would be more convenient to use an object that is in everyday use as part of the system so that it will be on hand whenever calibration needs to be done like whenever a camera is moved, added or replaced. Calibration using laser pointers has been done successfully, as described in Xing Chen, James Davis and Philipp Slusallek, Wide Area Camera Calibration Using Virtual Calibration Objects, IEEE Comp. Soc. Conf. on Computer Vision and Pattern Recognition (CVPR), June 2000, and addresses the issues of using a readily available device useful beyond calibration and of being viewable from multiple cameras, but it is limited in that the single point is not so easy to identify and track. In accordance with an embodiment of the inventive technique, the same object that supports a gesture interface is also used as the camera calibration object because there is a lot of overlap in how identifiable and easy to track an object is for both calibration and gesture recognition. In particular, features on a wand will be described that will make it an effective calibration object, as well as a gesture interface device.

From camera images it is useful to be able to reconstruct the three-dimensional (3D) space and to associate image points with world points. The wand can be used to point to world points identifying the matching image points in any camera that can view the wand. For example, consider the problem of installing a surveillance system, which includes many cameras. State of the art surveillance systems may include a limited 3D model of the environment. Some of this model can be determined by available floor plans. But the location of furniture will not be available, nor will the texture images necessary for a model. An application can be built in which once cameras are setup and installed, a user uses a wand to specify the locations of furniture, displays, pictures, etc. For example just as a drawing program has a mode for drawing flat rectangles on a flat surface, a space modeling application can have a mode where the wand is used to define rectangles in the space being modeled, such as the tops of tables or desks. Once a model of a space is formed, the wand also provides a method for specifying virtual changes, such as experimenting with where furniture could go.

Exemplary Wand Designs

In the remainder of the present description, the inventive techniques for designing and tracking wands will be discussed. An exemplary wand in accordance with an embodiment of the inventive concept can be seen in FIG. 1, which illustrates several useful aspects of the exemplary wand 100.

Specifically the shown exemplary wand 100 has colored regions 101-103, which are easy to track coarsely and to use for initializing tracking. The wand also contains an area with spiral markings 104, which helps determine the twist of the wand about its axis. The wand may also contain encoded information in the form of a band with cylindrical bar codes 105, and a band with corners (checkerboard) 106, which may be used to more precisely determine the wand pose when it is close to a camera. The aforesaid checkerboard pattern 106 can increase the precision of the tracking, and dots or blurred blobs may be placed in the center of the checkerboard squares to aid registration or as an alternate means for determining the twist.

Figure 2:
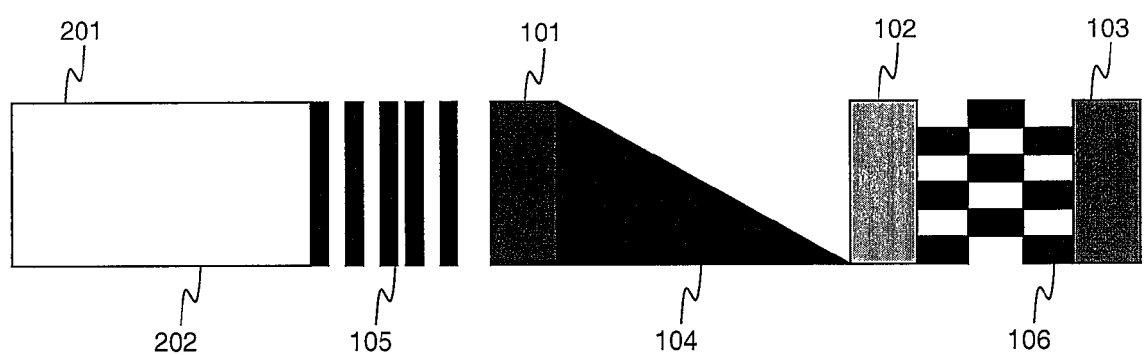
FIG. 2 illustrates an exemplary embodiment of a wand pattern.

In one embodiment of the invention, the inventive wands are easily constructed by printing out a design pattern and wrapping that pattern around a cylinder. Such printable design pattern 201, which can be used to easily construct the inventive feature wand 100 is shown in FIG. 2. The wand illustrated in FIG. 2 includes handle region 202, bar code region 105, twist code region 104, color blobs 101, 102 and 103 for coarse tracking, and precision feature region 106. The pattern 201 may be printed and rolled onto a cylinder to produce a wand 100 such as shown in FIG. 1.

Technical Details

Figure 3:
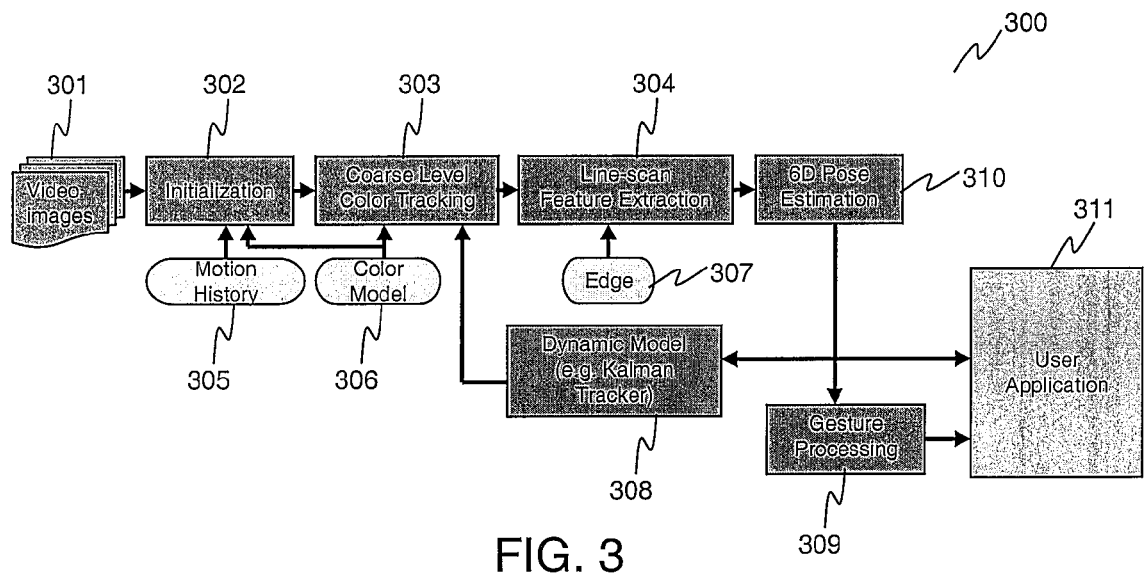
FIG. 3 provides an overview of an exemplary system in accordance with an embodiment of the inventive system.

An overview of an exemplary system 300 in accordance with an embodiment of the invention is shown in FIG. 3. The first step of tracking the wand is a coarse level tracking, which may be based on distinctive colored regions found on the wand, see step 303. In one implementation, initialization 302 uses a motion history 305 over the taken images 301 and searches for the colored regions using the color model 306. Once the regions are found, they are tracked using, for example, a modified version of the CAM SHIFT tracking algorithm provided as part of the OpenCV toolkit, well known to persons of skill in the art, and a dynamic model 308. If the tracker fails or the tracked results from multiple cameras are inconsistent, the initialization step 302 can be used to reinitialize the tracker. After the coarse locations are obtained, the edges 307 of the wand will be used to find a scan line along the length of the wand, in order to extract the features on the wand at step 304. This procedure is additionally illustrated in FIG. 5. A dynamic model (e.g. Kalman filter) 308 performs smoothing and predicts the position of the wand for the processing of the next frame. The 6D pose of the wand is estimated at step 310, which is followed by the gesture processing (step 309), the results of which are used to control the user application 311.

A Method for Determining the Pose

An exemplary method for determining the pose from three points along the wand will now be described. It should be understood that the described method is exemplary only and that other methods that use more points and are more robust could be used. For the sake of brevity, this simpler method is described herein based on the assumption of a typical pose and no special cases, though the method can easily be extended to handle these cases.

Figure 4:
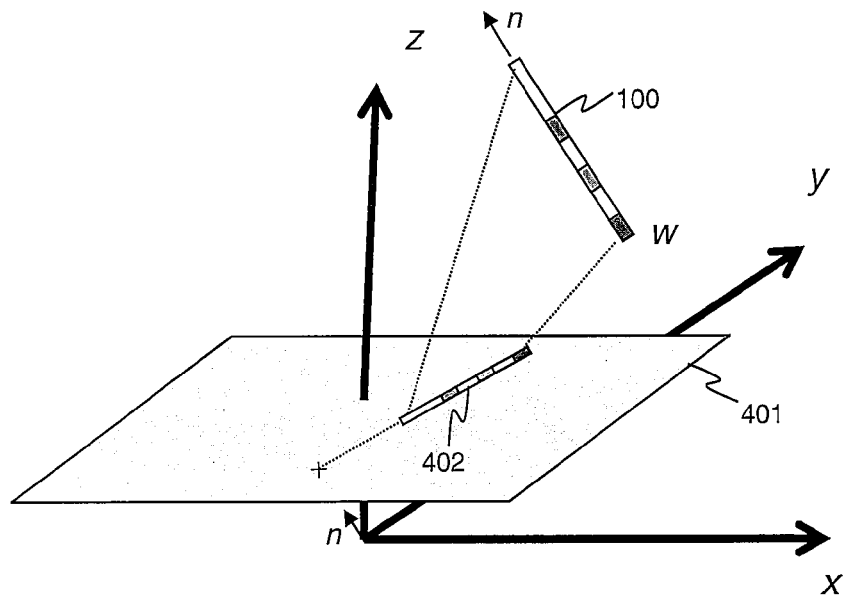
FIG. 4 illustrates an exemplary embodiment of a wand and its projection onto image plane.
Figure 5:
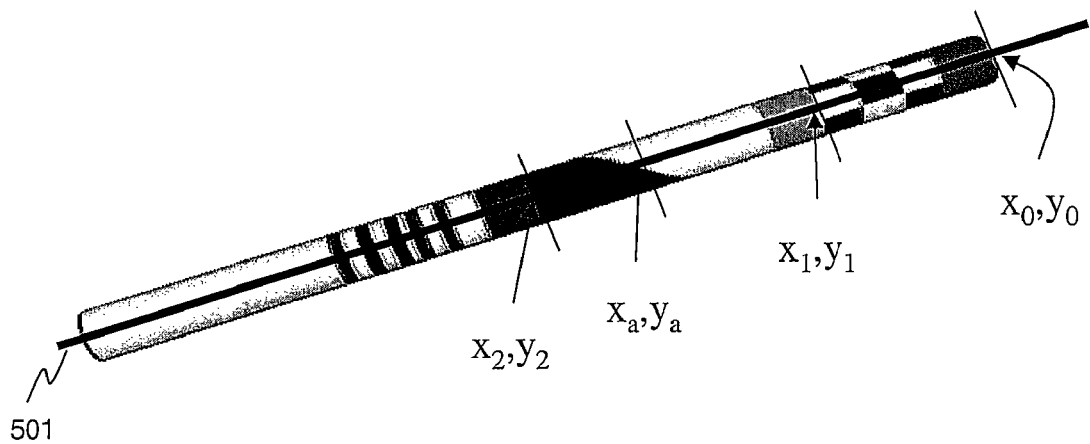
FIG. 5 illustrates exemplary technique for wand decoding.

The pose of the wand 100 may be characterized by its position and orientation. The position is given by a vector $w=(w_x, w_y, w_z)$ in the x, y and z coordinate system. That is taken as the position of the 'endpoint' of the wand. The orientation of the wand 100 is given by a normal vector $n=(n_x, n_y, n_z)$, as shown in FIG. 4. Additionally the 'twist' of the wand is given by an angle theta specifying a rotation about the axis determined by n. In the line-scan model of a wand, the positions of the other points are given by their distance along the normal from the end point, as shown in FIG. 5.

FIG. 4 illustrates an exemplary embodiment of a wand 100 and its projection 402 onto image plane 401. Specifically, the wand 100 is projected onto the image plane 401 by a pinhole perspective transformation. The five degree of freedom wand pose is specified by the position $w=(w_x, w_y, w_z)$, and the orientation described by the normal vector $n=(n_x, n_y, n_z)$. (And additional degree of freedom is given by the rotation (twist) of the wand about n, not depicted here.) Any wand orientation n, regardless of position will have a vanishing point at the point where a ray from the origin and with direction n intersects the image plane.

The pose of the wand 100 may be determined from the image coordinates of key points along the Wand. For purposes of analysis, world point coordinates will be considered in a natural reference frame of the camera, although of course given known camera pose these could be converted to any coordinate system. Assuming a pinhole camera model, with a center of projection at the origin, the image point (x,y) of a world point $w_x, w_x, w_z$ is given by:

$$x = f\frac{w_x}{w_z} - x_c$$

$$y = f\frac{w_y}{w_z} - y_c$$

where f is the focal length of the camera—the distance between the image plane 401 and the point of projection, and $x_c$, $y_c$ specify the principle point of the image.

FIG. 5 illustrates one exemplary technique for wand decoding. The image is decoded based on line scan. The wand 100 is found in the image using edge analysis, or by simple color tracking of distinctive colors. Then a scan line 501 is taken along the length of the wand, and the image coordinates of the intersection of that line with the beginnings of the color regions are determined, $(x_0, x_0)$, $(x_1, y_1)$, $(x_2, y_2)$ and the intersection with the twist code region $(x_a, y_a)$ is determined. This information is sufficient to determine the wand pose.

Because the effect of any values of f, $x_c$ and $y_c$ are simply translation and scaling of image coordinates, it will be assumed for this discussion that $f=1$ and $x_c=0$, $y_c=0$. The image coordinates of the projection of a point that is distance r from the wand end point are determined to be:

$$x = \frac{rn_x + w_x}{rn_z + w_z}$$

$$y = \frac{rn_y + w_y}{rn_z + w_z}$$

Note that for $r=0$ this is simply the image of the endpoint of the wand, and in the limit r->infinity, this approaches the vanishing point $(a=n_x/n_z, b=n_y/n_z)$ corresponding to any ray in the direction $n_x, n_x, n_z$.

Consider three points along the line of the wand, where the first point is at the end of the wand, the second point is distance $r_1$ from the end, and the third is distance $r_2$ from the end. Once the wand has been found in the image, these points may be determined by a line scan along the wand, finding the points where different color regions begin. Denote the coordinates of these three points by $(x_0, y_0)$, $(x_1, y_1)$, $(x_2, y_2)$. Using the above equations, we may determine six equations for the six unknowns of $w_x, w_x, w_z$, and $n_x, n_x, n_z$, namely:

$$x_0 = \frac{w_x}{w_z}$$

$$x_1 = \frac{r_1 n_x + w_x}{r_1 n_z + w_z}$$

$$x_2 = \frac{r_2 n_x + w_x}{r_2 n_z + w_z}$$

and three similar equations for $y_1$, $y_2$, $y_3$. It should be noted, however, that there are five degrees of freedom, since n is a normal vector. These equations may be solved to determine the wand pose, up to 'twist', the rotation a about the long axis of the wand.

Spiral for Determining Twist

Additionally, the image coordinates $x_a$, $y_a$ of the point at which the line scan intersects the twist encoding spiral may be determined. From this and the wand pose, the distance $r_a$ of that point from the end is determined by:

$$r_a = \frac{x n_y - n_x}{w_x - x w_y}$$

Then, assuming the length on the wand of the twist encoding band is $L_T$, that the twist along that length makes one revolution, and that the position of the start of that band is $r_T$, the angle θ of twist is:

$$\theta = 2\pi \frac{r_a - r_T}{L_T}$$

Summary of Inventive Method for Computing Wand Pose

The inventive method for determining wand pose inputs image points $(x_0, y_0)$, $(x_1, y_1)$, $(x_2, y_2)$ and produces the wand position point $w_x$, $w_y$, $w_z$ as well as wand orientation vector $n_x$, $n_y$, $n_z$ using the following calculations:

$$a = \frac{x_0 x_1 r_1 - x_1 x_2 r_1 - x_0 x_2 r_2 + x_1 x_2 r_2}{x_0 r_1 - x_2 r_1 - x_0 r_2 + x_1 r_2}$$

$$b = \frac{y_0 y_1 r_1 - y_1 y_2 r_1 - y_0 y_2 r_2 + y_1 y_2 r_2}{y_0 r_1 - y_2 r_1 - y_0 r_2 + y_1 r_2}$$

$$n_z = \sqrt{\frac{1}{1 + a^2 + b^2}}$$

$$n_x = a n_z$$

$$n_y = b n_z$$

$$w_z = \frac{(n_x - x_1 n_z) r_1}{x_1 - x_0}$$

$$w_x = w_z x_0$$

$$w_y = w_z y_0$$

$$r_a = \frac{x n_y - n_x}{w_x - x w_y}$$

$$\theta = 2\pi \frac{r_a - r_T}{L_T}$$

Other Designs Supporting Pose Determination

Below, some additional design features, which are useful for wand pose determination will be described.

Disambiguating Pose

Certain poses, while distinguishable in the exact case, may not be distinguishable in the presence of relatively little noise. For example, two poses, one almost parallel to the camera but tilted +5 degrees and one almost parallel to the camera but tilted −5 degrees may be hard to distinguish in practice. In one embodiment of the invention, the wands can be designed so that they have flat ends perpendicular to the scan line. The two ends can be painted different colors. Only the end pointing towards the camera will be visible, so the two poses can be distinguished by which color is seen.

Determining Pose Even when Most of the Wand is Obscured

In an embodiment of the invention, patterns of bars, which uniquely determine the distance from the end of the wand, together with a spiral wrapping around the wand multiple times, can be used to determine the pose even if only a small fraction of the wand is visible.

Figure 6:
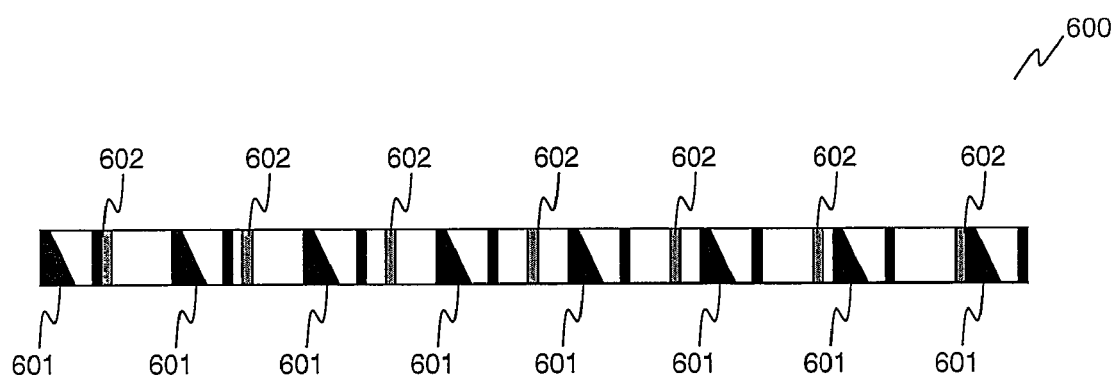
FIG. 6 illustrates an exemplary embodiment of a distributed feature pattern.

FIG. 6 illustrates an exemplary embodiment of a distributed feature pattern 600 for a wand. Information may be redundantly encoded on the wand in many possible ways. This exemplary wand has multiple twist encoding bands 601. Between the twist bands are blue bands 602 with the relative placement of each blue band indicating the relative position of that band along the wand.

Multiple Feature Point Decoding

An embodiment of the inventive technique involves processing features that can be determined alone a one-dimensional line-scan. However when the wand is close enough to the camera, the width of the wand becomes significant and points not lying on a single line can be used for pose estimation. An algorithm for determining pose from a set of world points and corresponding image is known to persons of skill in the art and can be easily implemented using existing modules, for example from the OpenCV package. In an embodiment of the invention, that algorithm is used to determine the wand pose using a single camera.

Multiple Camera Based Decoding

Several advantages arise from using multiple cameras. For one thing, typically when the wand pose cannot be decoded well in one camera because the wand is pointed nearly towards that camera, the pose can be determined well by another camera. Furthermore, the wand position can generally be determined much more accurately with two cameras, using triangulation methods. Also, if one of the cameras loses track of the wand position, for example because of a specular reflection or because it is obscured, the pose determined by other cameras can help the tracker in that camera to regain its track.

Encoding Wand Information Using Cylindrical Barcodes

Once the wand pose has been determined, a region containing encoded information such as a wand ID can be decoded. The image line scan is transformed back to a line scan along the wand, that is, the effects of perspective are eliminated, and the barcode decoded. This can be done in several ways, but a straightforward way is to have n band positions, which are either white or black to encode one bit of information per band.

Infrared Red Illumination and Retro-Reflective Marks

Figure 7:
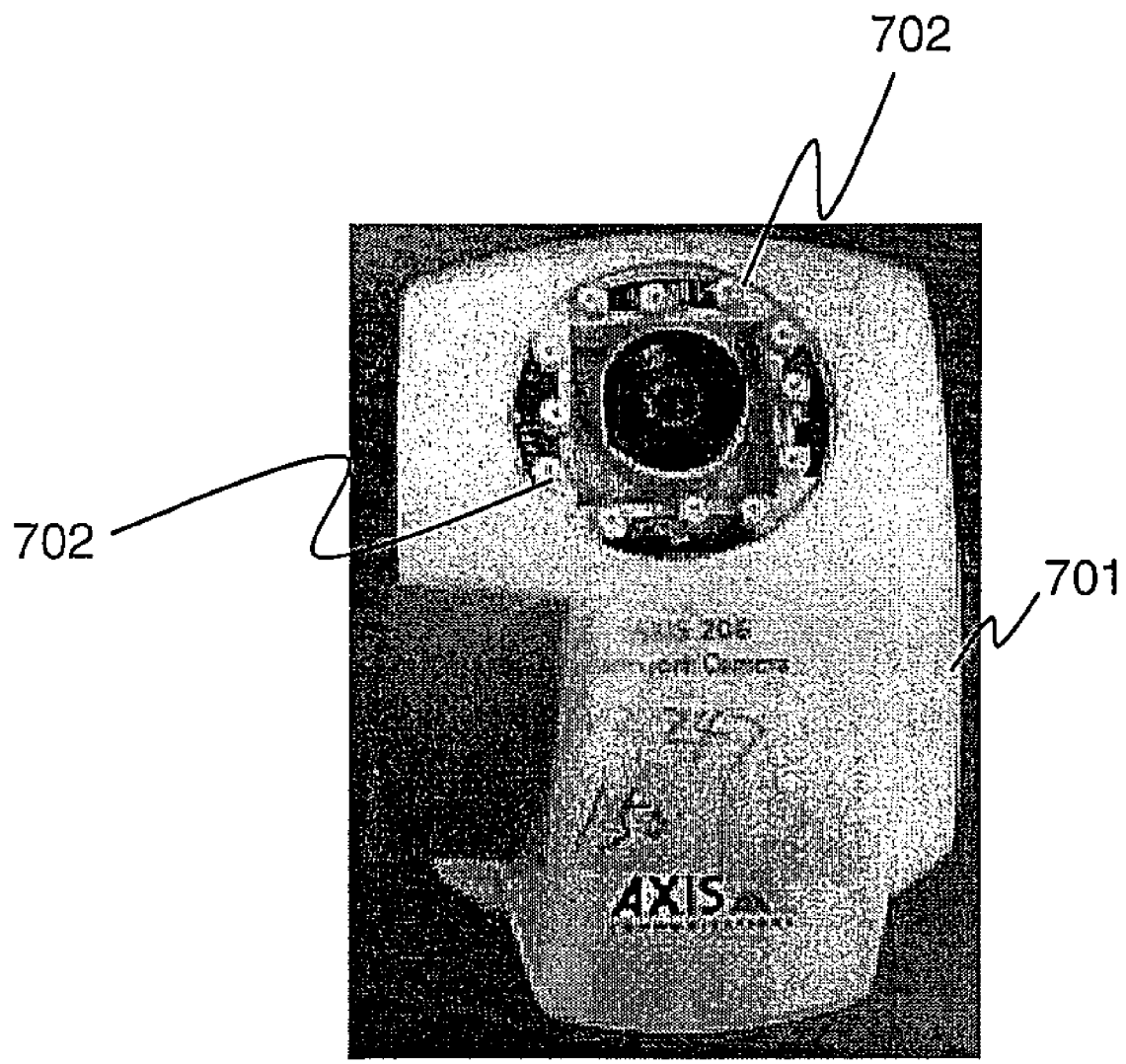
FIG. 7 illustrates an exemplary embodiment of a modified camera for infra-red (IR) tracking.

Another embodiment of the inventive system uses modified cameras encircled with IR (infrared red) light emitting diodes, as shown in FIG. 7. In this embodiment, the wand is constructed of IR reflective paper, or of retro-reflective material, which reflects light strongly back in the direction of the source. When these cameras are fitted with a matching IR filter, the resulting image is very easy to segment.

FIG. 7 illustrates an exemplary embodiment of a modified camera for IR tracking. This figure depicts a modified AXIS 206 network camera 701, with Infrared Red light emitting diodes 702 for light sources. Beneath the lens is an IR filter 9 not shown), so the resulting images of wands constructed of IR reflective material have very high signal to noise ratios.

Exemplary Hardware Platform

Figure 8:
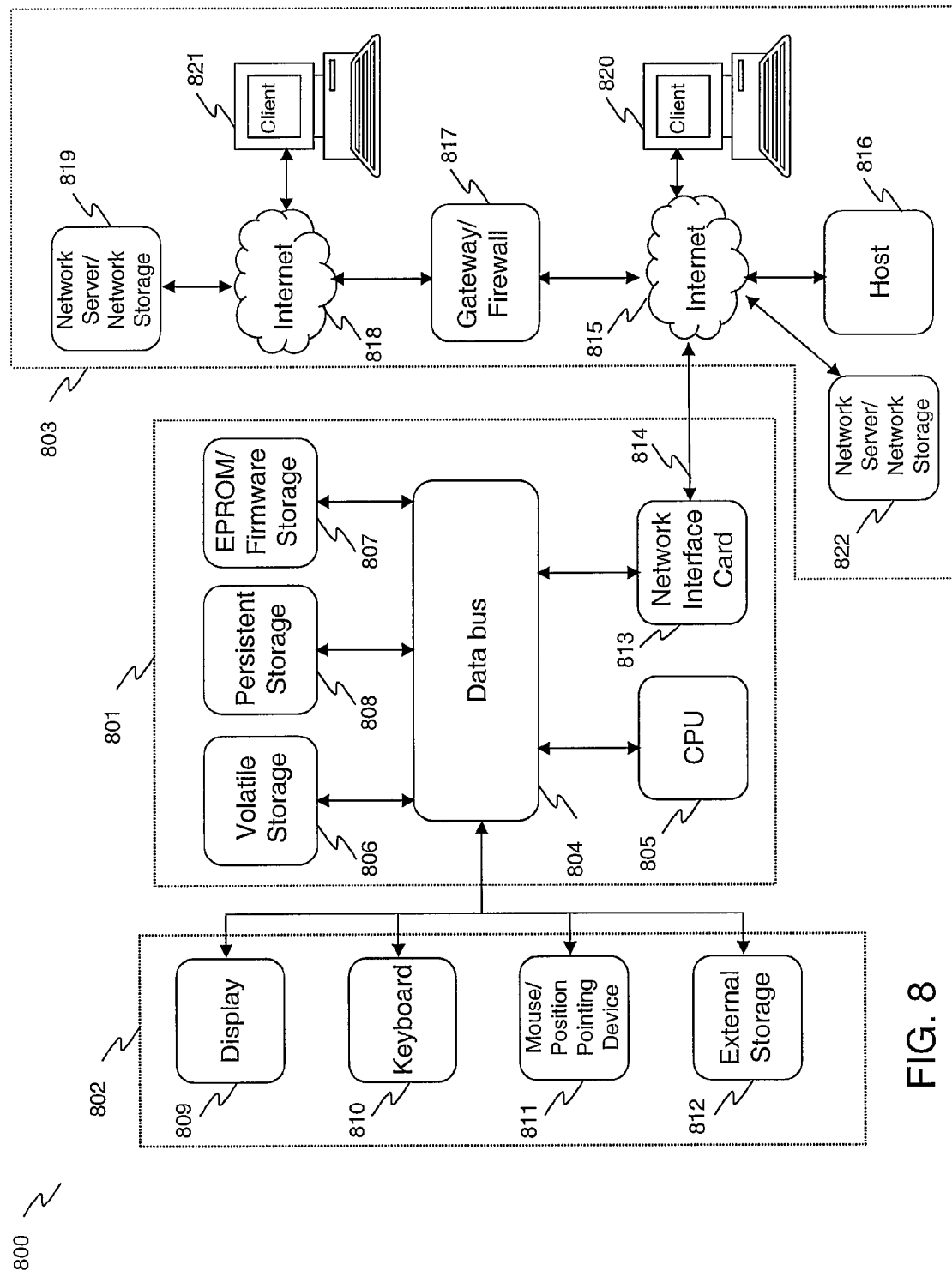
FIG. 8 illustrates an exemplary embodiment of a computer platform upon which the inventive system may be implemented.

FIG. 8 is a block diagram that illustrates an embodiment of a computer/server system 800 upon which an embodiment of the inventive methodology may be implemented. The system 800 includes a computer/server platform 801, peripheral devices 802 and network resources 803.

The computer platform 801 may include a data bus 804 or other communication mechanism for communicating information across and among various parts of the computer platform 801, and a processor 805 coupled with bus 801 for processing information and performing other computational and control tasks. Computer platform 801 also includes a volatile storage 806, such as a random access memory (RAM) or other dynamic storage device, coupled to bus 804 for storing various information as well as instructions to be executed by processor 805. The volatile storage 806 also may be used for storing temporary variables or other intermediate information during execution of instructions by processor 805. Computer platform 801 may further include a read only memory (ROM or EPROM) 807 or other static storage device coupled to bus 804 for storing static information and instructions for processor 805, such as basic input-output system (BIOS), as well as various system configuration parameters. A persistent storage device 808, such as a magnetic disk, optical disk, or solid-state flash memory device is provided and coupled to bus 801 for storing information and instructions.

Computer platform 801 may be coupled via bus 804 to a display 809, such as a cathode ray tube (CRT), plasma display, or a liquid crystal display (LCD), for displaying information to a system administrator or user of the computer platform 801. An input device 810, including alphanumeric and other keys, is coupled to bus 801 for communicating information and command selections to processor 805. Another type of user input device is cursor control device 811, such as a mouse, a trackball, or cursor direction keys for communicating direction information and command selections to processor 804 and for controlling cursor movement on display 809. This input device typically has two degrees of freedom in two axes, a first axis (e.g., x) and a second axis (e.g., y), that allows the device to specify positions in a plane.

An external storage device 812 may be connected to the computer platform 801 via bus 804 to provide an extra or removable storage capacity for the computer platform 801. In an embodiment of the computer system 800, the external removable storage device 812 may be used to facilitate exchange of data with other computer systems.

The invention is related to the use of computer system 800 for implementing the techniques described herein. In an embodiment, the inventive system may reside on a machine such as computer platform 801. According to one embodiment of the invention, the techniques described herein are performed by computer system 800 in response to processor 805 executing one or more sequences of one or more instructions contained in the volatile memory 806. Such instructions may be read into volatile memory 806 from another computer-readable medium, such as persistent storage device 808. Execution of the sequences of instructions contained in the volatile memory 806 causes processor 805 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 805 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 808. Volatile media includes dynamic memory, such as volatile storage 806. Transmission media includes coaxial cables, copper wire and fiber optics, including the wires that comprise data bus 804. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 805 for execution. For example, the instructions may initially be carried on a magnetic disk from a remote computer. Alternatively, a remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on the data bus 804. The bus 804 carries the data to the volatile storage 806, from which processor 805 retrieves and executes the instructions. The instructions received by the volatile memory 806 may optionally be stored on persistent storage device 808 either before or after execution by processor 805. The instructions may also be downloaded into the computer platform 801 via Internet using a variety of network data communication protocols well known in the art.

The computer platform 801 also includes a communication interface, such as network interface card 813 coupled to the data bus 804. Communication interface 813 provides a two-way data communication coupling to a network link 814 that is connected to a local network 815. For example, communication interface 813 may be an integrated services digital network (ISDN) card or a modem to provide a data communication connection to a corresponding type of telephone line. As another example, communication interface 813 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 813 sends and receives electrical, electromagnetic or optical signals that carry digital data streams representing various types of information.

Network link 813 typically provides data communication through one or more networks to other network resources. For example, network link 814 may provide a connection through local network 815 to a host computer 816, or a network storage/server 817. Additionally or alternatively, the network link 813 may connect through gateway/firewall 817 to the wide-area or global network 818, such as an Internet. Thus, the computer platform 801 can access network resources located anywhere on the Internet 818, such as a remote network storage/server 819. On the other hand, the computer platform 801 may also be accessed by clients located anywhere on the local area network 815 and/or the Internet 818. The network clients 820 and 821 may themselves be implemented based on the computer platform similar to the platform 801.

Local network 815 and the Internet 818 both use electrical, electromagnetic or optical signals that carry digital data streams. The signals through the various networks and the signals on network link 814 and through communication interface 813, which carry the digital data to and from computer platform 801, are exemplary forms of carrier waves transporting the information.

Computer platform 801 can send messages and receive data, including program code, through the variety of network(s) including Internet 818 and LAN 815, network link 814 and communication interface 813. In the Internet example, when the system 801 acts as a network server, it might transmit a requested code or data for an application program running on client(s) 820 and/or 821 through Internet 818, gateway/firewall 817, local area network 815 and communication interface 813. Similarly, it may receive code from other network resources.

The received code may be executed by processor 805 as it is received, and/or stored in persistent or volatile storage devices 808 and 806, respectively, or other non-volatile storage for later execution. In this manner, computer system 801 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, per, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A computer interface system comprising:
   a. At least one camera operable to create an image of a wand handled by a user, the wand comprising a plurality of features; and
   b. A processing module operable to receive the created image of the wand and determine the pose of the wand based on the features of the wand, the pose of the wand comprising a position of the wand, an orientation of the wand and a twist of the wand, wherein the determined pose of the wand is used to control a user application;
   wherein the processing module is operable to determine the pose of the wand based at least on a precision features region;
   wherein the precision features region comprises a checkerboard pattern; and
   wherein the checkerboard pattern comprises dots or blurred blobs in centers of checkerboard squares.

2. The computer interface system of claim 1, wherein the processing module is operable to determine the pose of the wand based at least on a plurality of color regions of the wand.

3. The computer interface system of claim 1, wherein the processing module is operable to determine the pose of the wand based at least on a twist code region of the wand.

4. The computer interface system of claim 3, wherein the twist code region comprises a spiral pattern.

5. The computer interface system of claim 1, wherein the wand further comprises a bar code region encoding information.

6. The computer interface system of claim 5, wherein the processing module is operable to determine an identifier of the wand based on the information encoded in the bar code region of the wand.

7. The computer interface system of claim 1, further comprising a second camera operable to create images of the wand handled by the user, wherein the second camera is disposed at a different position from the at least one camera.

8. The computer interface system of claim 1, wherein the processing module is operable to determine the pose of the wand by reconstructing a scan line of the wand and determining at least one intersection point of the scan line of the wand with the features of the wand.

9. The computer interface system of claim 1, wherein the wand comprises at least one of redundant patterns of bars uniquely determining the distance from the end of the wand; redundant twist encoding bands; a spiral wrapping around the wand multiple times; and a plurality of colored bands; and wherein the processing module is operable to determine the pose of the wand when only a small portion of the wand is in view.

10. The computer interface system of claim 1, wherein the at least one camera is an infra-red camera and wherein a surface of the wand comprises reflective or retro-reflective material.

11. The computer interface system of claim 10, wherein the infra-red camera comprises at least one infra-red light emitting source and at least one infra-red filter.

12. The computer interface system of claim 1, wherein the processing module is operable to calibrate the at least one camera based on the image of the wand obtained by the at least one camera.

13. A method for controlling a computer application based on a pose of a wand handled by a user, the wand comprising a plurality of features, the method comprising:
   a. Creating an image of a wand handled by the user using at least one camera;
   b. Using the created image to determine the pose of the wand based on the features of the wand, the pose of the wand comprising a position of the wand, an orientation of the wand and a twist of the wand; and
   c. Controlling the computer application based on the determined pose of the wand;

wherein the pose of the wand is determined based at least on a precision features region of the wand;
wherein the precision features region comprises a checkerboard pattern; and
wherein the checkerboard pattern comprises dots or blurred blobs in centers of checkerboard squares.

14. The method of claim 13, wherein the pose of the wand is determined based at least on a plurality of color regions of the wand.

15. The method of claim 13, wherein the twist of the wand is determined based at least on a twist code region of the wand.

16. The method of claim 13, wherein the twist code region comprises a spiral pattern.

17. The method of claim 13, further comprising determining an identifier of the wand using information encoded in a bar code region of the wand.

18. The method of claim 13, further comprising creating a second image of the wand using a second camera.

19. The method of claim 13, wherein the pose of the wand is determined by reconstructing a scan line of the wand and determining at least one intersection point of the scan line of the wand with the features of the wand.

20. The method of claim 13, wherein the pose of the wand is determined using a color coding of at least one end of the wand, when only a small portion of the wand is in view.

21. The method of claim 13, wherein the image of the wand is an infra-red image.

22. A computer interface system comprising:
a. At least one camera operable to create an image of a wand handled by a user, the wand comprising a plurality of features; and
b. A processing module operable to receive the created image of the wand and determine the pose of the wand based on the features of the wand, the pose of the wand comprising a position of the wand, an orientation of the wand and a twist of the wand, wherein the determined pose of the wand is used to control a user application;
wherein the wand further comprises a bar code region encoding information; and
wherein the processing module is operable to determine an identifier of the wand based on the information encoded in the bar code region of the wand.

23. The computer interface system of claim 22, wherein the processing module is operable to determine the pose of the wand based at least on a plurality of color regions of the wand.

24. The computer interface system of claim 22, wherein the processing module is operable to determine the pose of the wand based at least on a twist code region of the wand.

25. The computer interface system of claim 24, wherein the twist code region comprises a spiral pattern.

26. The computer interface system of claim 22, wherein the wand further comprises a bar code region encoding information.

27. The computer interface system of claim 22, further comprising a second camera operable to create images of the wand handled by the user, wherein the second camera is disposed at a different position from the at least one camera.

28. The computer interface system of claim 22, wherein the processing module is operable to determine the pose of the wand by reconstructing a scan line of the wand and determining at least one intersection point of the scan line of the wand with the features of the wand.

29. The computer interface system of claim 22, wherein the wand comprises at least one of redundant patterns of bars uniquely determining the distance from the end of the wand; redundant twist encoding bands; a spiral wrapping around the wand multiple times; and a plurality of colored bands; and wherein the processing module is operable to determine the pose of the wand when only a small portion of the wand is in view.

30. The computer interface system of claim 22, wherein the at least one camera is an infra-red camera and wherein a surface of the wand comprises reflective or retro-reflective material.

31. The computer interface system of claim 30, wherein the infra-red camera comprises at least one infra-red light emitting source and at least one infra-red filter.

32. The computer interface system of claim 22, wherein the processing module is operable to calibrate the at least one camera based on the image of the wand obtained by the at least one camera.

* * * * *